United States Patent
Kukla et al.

(10) Patent No.: US 11,891,017 B2
(45) Date of Patent: Feb. 6, 2024

(54) UNDER HOOD FRONT STORAGE CLOSEOUT

(71) Applicant: GM GLOBAL TECHNOLOGY OPERATIONS LLC, Detroit, MI (US)

(72) Inventors: Robert J. Kukla, Rochester Hills, MI (US); Kyle C. Smith, Rochester Hills, MI (US); Andre Hormiz, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 102 days.

(21) Appl. No.: 17/583,662

(22) Filed: Jan. 25, 2022

(65) Prior Publication Data

US 2023/0234512 A1 Jul. 27, 2023

(51) Int. Cl.
*B60R 5/02* (2006.01)
*B62D 25/12* (2006.01)

(52) U.S. Cl.
CPC ............... *B60R 5/02* (2013.01); *B62D 25/12* (2013.01)

(58) Field of Classification Search
CPC .... B60R 5/02; B60R 5/04; B60R 7/02; B62D 25/087; B62D 25/105; B62D 25/12
USPC .............................................. 296/24.3, 24.45
See application file for complete search history.

(56) References Cited

U.S. PATENT DOCUMENTS

| | | |
|---|---|---|
| 10,800,458 B2 | 10/2020 | Makowski et al. |
| 11,628,888 B2 | 4/2023 | Cote |
| 2020/0262482 A1* | 8/2020 | Makowski ............. B62D 25/12 |
| 2022/0009419 A1* | 1/2022 | Kim ....................... B62D 25/12 |
| 2022/0234507 A1* | 7/2022 | Kowollik .................. B60R 7/02 |
| 2022/0355738 A1* | 11/2022 | Gill ............................ B60R 5/02 |
| 2022/0371519 A1* | 11/2022 | Weber ..................... B60R 21/34 |

FOREIGN PATENT DOCUMENTS

| | | | | |
|---|---|---|---|---|
| CN | 107433911 A | * | 12/2017 | ............. B60R 21/34 |
| DE | 102004059737 B4 | | 6/2006 | |
| EP | 1612127 A2 | * | 1/2006 | ............... B60R 5/04 |

OTHER PUBLICATIONS

English translation of EP 1 612 127; retrieved via PatentTranslate located at www.epo.org. (Year: 2023).*
German Office Action for German Application No. 102022125926.9; dated May 9, 2023; 10 pages.

* cited by examiner

*Primary Examiner* — Jason S Daniels
(74) *Attorney, Agent, or Firm* — CANTOR COLBURN LLP

(57) ABSTRACT

An under hood storage system of a vehicle includes an under hood storage compartment located in an under hood area of a vehicle, and a hood assembly that, when in a closed position closes the under hood storage compartment. The hood assembly includes an under hood panel having a first portion formed from a first material, and a second portion surrounding the first portion defining an outer perimeter of the under hood panel. The second portion is formed from a second material softer than the first material. One or more attachment features secure the under hood panel to the hood assembly. The under hood panel interacts with the under hood storage compartment to close the under hood storage compartment.

20 Claims, 2 Drawing Sheets

UNDER HOOD FRONT STORAGE CLOSEOUT

INTRODUCTION

The subject disclosure relates to vehicles, and more particularly to hood assemblies of motor vehicles.

In a typical motor vehicle, an engine or other propulsion system components are located under a vehicle hood, extending forward of a passenger compartment of the vehicle. In recent years, vehicle manufacturers have placed storage compartments under the hood, in an effort to increase overall vehicle storage capabilities. A close out panel is installed on an underside of the hood assembly, such that when the hood is closed by a user the close out panel covers that under hood storage compartment, thus closing the compartment. In some configurations, it is desired to seal the under hood compartment, preventing ingress of dirt, moisture, and other contaminants. In those configurations, a seal, typically a bulb seal, is installed to one of the compartment or the close out panel to provide the needed sealing when the vehicle hood is closed.

SUMMARY

In one embodiment, an under hood panel of a vehicle includes a first portion formed from a first material, and a second portion surrounding the first portion defining an outer perimeter of the under hood panel. The second portion is formed from a second material softer than the first material. One or more attachment features secure the under hood panel to a hood assembly of a vehicle.

Additionally or alternatively, in this or other embodiments the second portion seals to an under hood storage compartment when the hood assembly is in a closed position.

Additionally or alternatively, in this or other embodiments the second portion is attached to the first portion at an outer perimeter of the first portion.

Additionally or alternatively, in this or other embodiments the second portion is attached to the first portion via stake welding.

Additionally or alternatively, in this or other embodiments a panel seal is configured to seal between the second portion and the first portion.

Additionally or alternatively, in this or other embodiments the panel seal is located in a panel recess of the second portion and extends toward the first portion.

Additionally or alternatively, in this or other embodiments the one or more attachment features are located in the panel recess.

Additionally or alternatively, in this or other embodiments the first portion is formed from a polypropylene material, and the second portion is formed from an ethylene propylene diene monomer material.

In another embodiment, an under hood storage system of a vehicle includes an under hood storage compartment located in an under hood area of a vehicle, and a hood assembly that, when in a closed position closes the under hood storage compartment. The hood assembly includes an under hood panel having a first portion formed from a first material, and a second portion surrounding the first portion defining an outer perimeter of the under hood panel. The second portion is formed from a second material softer than the first material. One or more attachment features secure the under hood panel to the hood assembly. The under hood panel interacts with the under hood storage compartment to close the under hood storage compartment.

Additionally or alternatively, in this or other embodiments the second portion seals to an under hood storage compartment when the hood assembly is in a closed position.

Additionally or alternatively, in this or other embodiments the second portion is attached to the first portion at an outer perimeter of the first portion.

Additionally or alternatively, in this or other embodiments the second portion is attached to the first portion via stake welding.

Additionally or alternatively, in this or other embodiments a panel seal is configured to seal between the second portion and the first portion.

Additionally or alternatively, in this or other embodiments the panel seal is located in a panel recess of the second portion and extends toward the first portion.

Additionally or alternatively, in this or other embodiments the one or more attachment features are located in the panel recess.

Additionally or alternatively, in this or other embodiments the first portion is formed from a polypropylene material, and the second portion is formed from an ethylene propylene diene monomer material.

Additionally or alternatively, in this or other embodiments the second portion interacts with a compartment lip of the under hood storage compartment.

In yet another embodiment, a method of enclosing an under hood storage compartment of a vehicle includes positioning an under hood storage compartment in an under hood area of a vehicle, and closing a hood assembly over the under hood storage compartment, such that an under hood panel of the hood assembly interacts with the under hood storage compartment to enclose the under hood storage compartment. The under hood panel includes a first portion formed from a first material, and a second portion surrounding the first portion defining an outer perimeter of the under hood panel. The second portion is formed from a second material softer than the first material. One or more attachment features secure the under hood panel to the hood assembly.

Additionally or alternatively, in this or other embodiments the second portion is sealed to the under hood storage compartment to seal the under hood storage compartment.

Additionally or alternatively, in this or other embodiments the second portion interacts with a compartment lip of the under hood storage compartment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
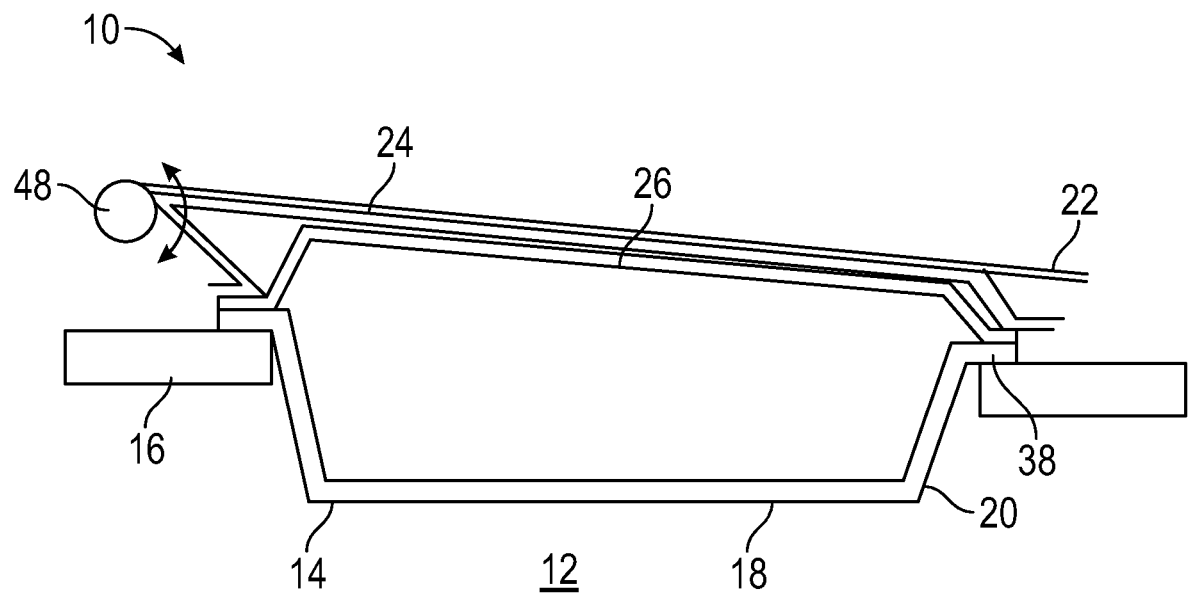
FIG. 1 is a cross-sectional view of an embodiment of a hood assembly and under hood storage compartment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a partial cross-sectional view of a hood assembly 10 for a vehicle is illustrated. The hood assembly 10 encloses an under hood area 12 of the vehicle, which may contain, for example, an engine and/or other propulsion system components of the vehicle. The hood assembly 10 is movable between an open position and a closed position by moving the hood assembly 10 on one or more hinges 48. A storage compartment 14 is located in the under hood area 12, and is attached to, for example, a side frame 16 of the vehicle. The storage compartment 14 is configured with a compartment base 18, and compartment sidewalls 20 extending upwardly from the compartment base 18. In some embodiments, the compartment base 18 is generally rectangular, but other shapes of storage compartments 14 and compartment base 18 are contemplated within the scope of the present disclosure. In some embodiments, the storage compartment 14 is formed from a polymer or composite material, while in other embodiments the storage compartment 14 is formed from a metal material, such as stamped steel.

The hood assembly 10 includes one or more hood panels, such as a hood outer panel 22 and a hood inner panel 24 attached to the hood outer panel 22 by, for example, welding. A close out panel 26 is attached to the hood inner panel 24, and when the hood assembly 10 is in the closed position, such as illustrated in FIG. 1, the close out panel 26 defines a cover for the storage compartment 14. In some embodiments, the close out panel 26 seals the storage compartment 14 to prevent ingress of water, dirt and other contaminants into the storage compartment 14.

Figure 2:
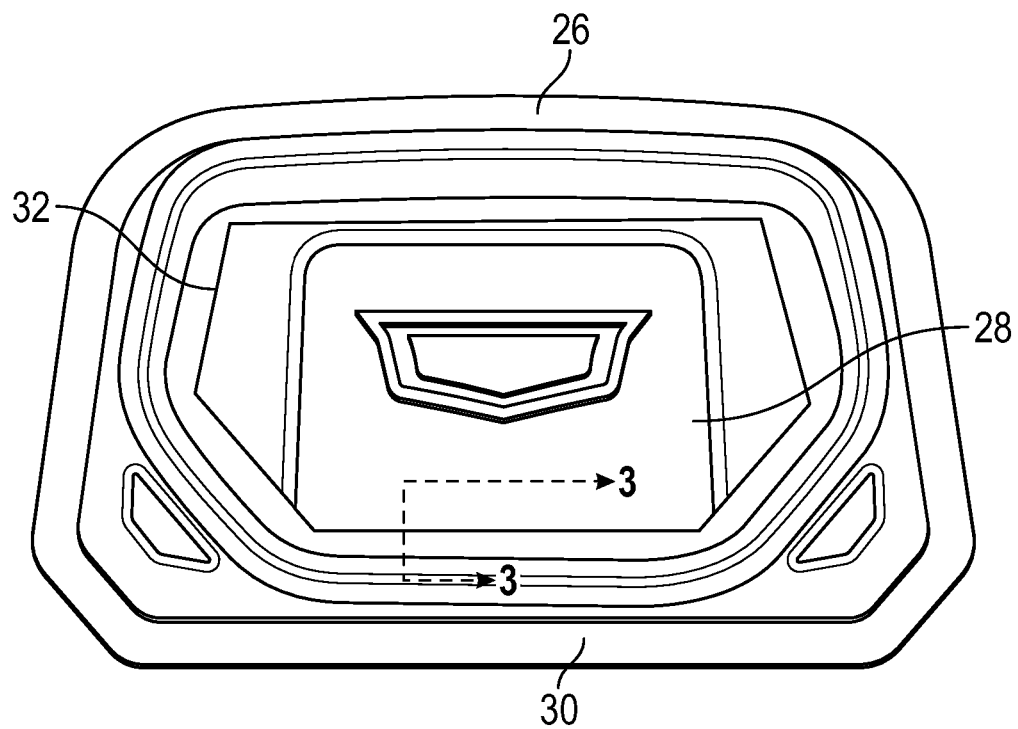
FIG. 2 is a plan view of an embodiment of a closeout panel of the hood assembly.

Referring now to FIG. 2, the close out panel 26 has a polymer construction, and has an inner portion 28, and an outer portion 30 surrounding the inner portion 28 and defining an outer perimeter of the close out panel 26. The inner portion 28 is formed from a first material, and the outer portion 30 is formed from a second material different from the first material. In some embodiments, the second material is softer than the first material, having a greater compressibility that the first material. For example, in one embodiment the first material used to form the inner portion 28 is a polypropylene material and the second material used to form the outer portion is an ethylene propylene diene monomer (EPDM) material, either in solid form or as a closed-cell foam or open-cell foam material.

Figure 3:
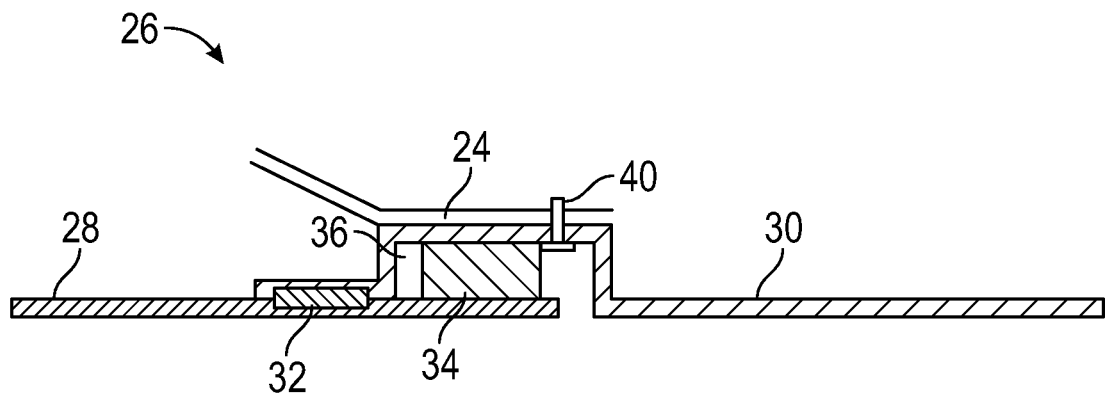
FIG. 3 is a cross-sectional view of an embodiment of a closeout panel of the hood assembly taken at a vehicle central axis.

Referring to FIG. 3, the outer portion 30 is attached to the inner portion 28 at a joint 32, which extends continuously along an outer perimeter of the inner portion 28. In some embodiments, the outer portion 30 is attached to the inner portion 28 by stake welding extending along the joint 32. Alternatively, the outer portion 30 may be attached to the inner portion 28 by adhesive, mechanical fasteners or other securing means. In the embodiment illustrated, the stake welding extends continuously around the joint 32, while in other embodiments the stake welding or other securing is discontinuous or intermittent along the joint 32. A foam seal 34 may be utilized near or concurrent with the joint 32 to prevent ingress of contaminants between the inner portion 28 and the outer portion 30 at the joint 32. In some embodiments, a seal recess 36 is formed in the outer portion 30 and the foam seal 34 is disposed in the seal recess 36 and extends between the outer portion 30 and the inner portion 28. Further, one or more close out fasteners 40 may be located in the seal recess 36. The close out fasteners 40 are utilized to secure the close out panel 26 to the hood assembly 10.

Figure 4:
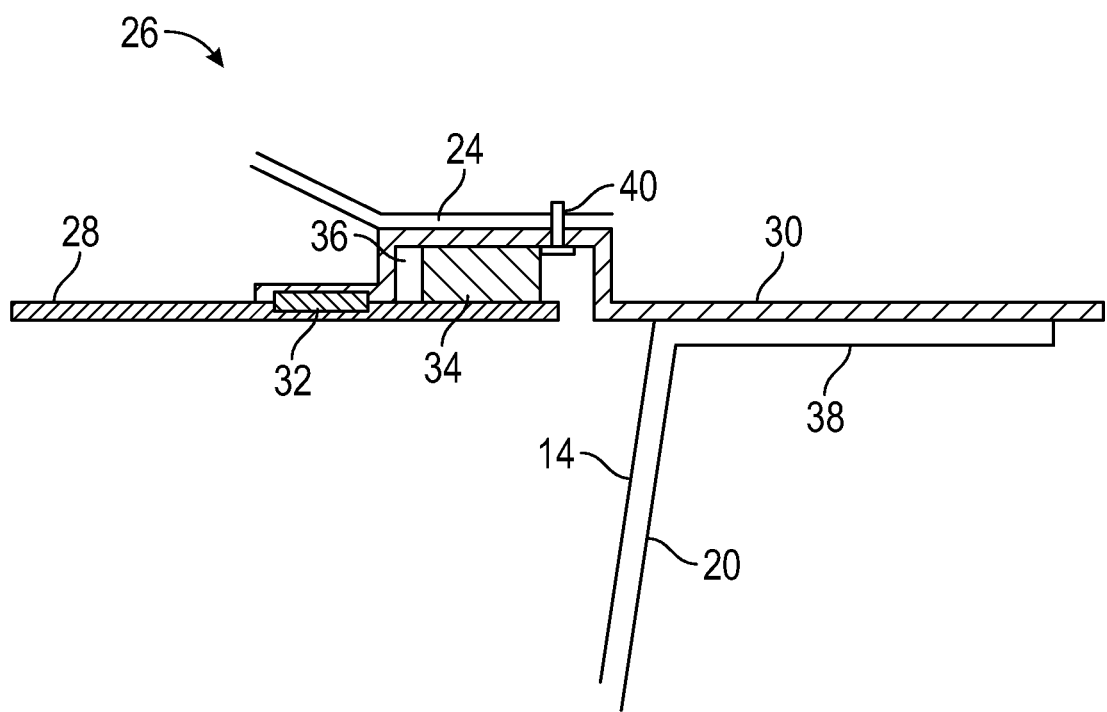
FIG. 4. is a partial cross-sectional view of engagement of a closeout panel with a storage compartment taken at the vehicle central axis.

Referring now to FIG. 4, when the hood assembly 10 is in the closed position, the close out panel 26 defines a cover for the storage compartment 14. The storage compartment 14 has an outer lip 38 that extends outwardly from the compartment sidewalls 20 and defines an outer perimeter of the storage compartment 14. The close out panel 26 is located such that when the hood assembly 10 is in the closed position, the outer portion 30 of the close out panel 26 contacts the outer lip 38 of the storage compartment 14. In some embodiments, the outer portion 30 may be compressed at the outer lip 38 to enhance sealing of the storage compartment 14 via the interface between the outer lip 38 and the outer portion 30.

Using the softer second material to form the outer portion 30 of the closeout panel 26 removes the need for a separate bulb seal to seal to the storage compartment. Further, using the softer second material allows for tuning of the stiffness of the closeout panel 26, by modifying position and/or thickness, for example, of the outer portion 30. This allows the structure to be optimized for performance to meet vulnerable roadway user (VRU) requirements and other performance requirements.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An under hood panel of a vehicle comprising:
    a first portion formed from a first material;
    a second portion surrounding the first portion defining an outer perimeter of the under hood panel, the second portion formed from a second material softer than the first material; and
    one or more attachment features extending through the second portion to attach the under hood panel to a hood assembly of a vehicle.

2. The under hood panel of claim 1, wherein the second portion seals to an under hood storage compartment when the hood assembly is in a closed position.

3. The under hood panel of claim 1, wherein the second portion is attached to the first portion at an outer perimeter of the first portion.

4. The under hood panel of claim 3, wherein the second portion is attached to the first portion via stake welding.

5. The under hood panel of claim 1, further comprising a panel seal to seal between the second portion and the first portion.

6. The under hood panel of claim 5, wherein the panel seal is disposed in a panel recess of the second portion and extends toward the first portion.

7. The under hood panel of claim 6, wherein the one or more attachment features are disposed in the panel recess.

8. The under hood panel of claim 1, wherein:
    the first portion is formed from a polypropylene material; and the second portion is formed from an ethylene propylene diene monomer material.

9. An under hood storage system of a vehicle, comprising:
an under hood storage compartment disposed in an under hood area of a vehicle; and
a hood assembly that, when in a closed position closes the under hood storage compartment, the hood assembly including an under hood panel having:
a first portion formed from a first material;
a second portion surrounding the first portion defining an outer perimeter of the under hood panel, the second portion formed from a second material softer than the first material; and
one or more attachment features extending through the second portion to secure the under hood panel to the hood assembly;
wherein the under hood panel interacts with the under hood storage compartment to close the under hood storage compartment.

10. The under hood storage system of claim 9, wherein the second portion seals to an under hood storage compartment when the hood assembly is in a closed position.

11. The under hood storage system of claim 9, wherein the second portion is attached to the first portion at an outer perimeter of the first portion.

12. The under hood storage system of claim 11, wherein the second portion is attached to the first portion via stake welding.

13. The under hood storage system of claim 9, further comprising a panel seal to seal between the second portion and the first portion.

14. The under hood storage system of claim 13, wherein the panel seal is disposed in a panel recess between the second portion and extends toward the first portion.

15. The under hood storage system of claim 14, wherein the one or more attachment features are disposed in the panel recess.

16. The under hood storage system of claim 9, wherein:
the first portion is formed from a polypropylene material; and
the second portion is formed from an ethylene propylene diene monomer material.

17. The under hood storage system of claim 9, wherein the second portion interacts with a compartment lip of the under hood storage compartment.

18. A method of enclosing an under hood storage compartment of a vehicle, comprising:
positioning an under hood storage compartment in an under hood area of a vehicle; and
closing a hood assembly over the under hood storage compartment, such that an under hood panel of the hood assembly interacts with the under hood storage compartment to enclose the under hood storage compartment, the under hood panel including:
a first portion formed from a first material;
a second portion surrounding the first portion defining an outer perimeter of the under hood panel, the second portion formed from a second material softer than the first material; and
one or more attachment features extending through the second portion to secure the under hood panel to the hood assembly.

19. The method of claim 18, further comprising sealing between the second portion and the under hood storage compartment to seal the under hood storage compartment.

20. The method of claim 18, wherein the second portion interacts with a compartment lip of the under hood storage compartment.

* * * * *